May 5, 1959  G. UPTON, JR  2,885,276
ABRASIVE PRODUCTS AND METHOD OF MAKING
Filed July 16, 1957  2 Sheets-Sheet 1

ADIPIC ACID + DIETHYLENE GLYCOL → DIETHYLENE GLYCOL MONOADIPATE
LINEAR POLYESTER

DIETHYLENE GLYCOL ADIPATE POLYMER

Inventor
George Upton, Jr.
by Harold R. Savage
Atty

May 5, 1959        G. UPTON, JR        2,885,276
ABRASIVE PRODUCTS AND METHOD OF MAKING
Filed July 16, 1957        2 Sheets-Sheet 2

REACTION OF HYDROXYL WITH ISOCYANATE

REACTION OF CARBOXYL WITH ISOCYANATE

TYPICAL ISOCYANATE REACTIONS

Figure 2:
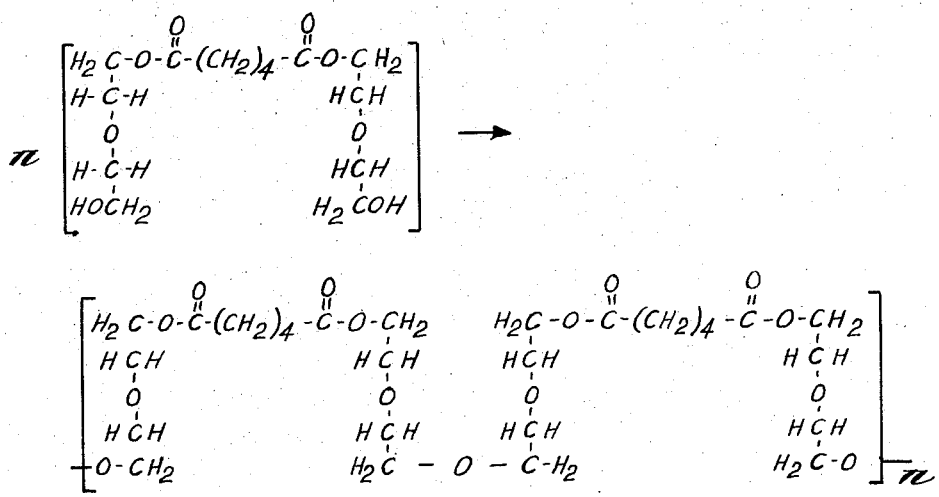

WHERE:

R = GLYCOL ADIPATE POLYMER, (FIGURE 2)
   R' = ARYL GROUP OF AN ARYL DIISOCYANATE

POLYMER - DIISOCYANATE REACTION

Inventor
George Upton, Jr.
by Harold R. Savage
Att'y

United States Patent Office 2,885,276
Patented May 5, 1959

2,885,276

ABRASIVE PRODUCTS AND METHOD OF MAKING

George Upton, Jr., Rockland, Mass., assignor to Chemical Research Corporation, Rockland, Mass., a corporation of Massachusetts Application July 16, 1957, Serial No. 672,160

6 Claims. (Cl. 51—298)

This invention relates to an improvement in the bonding of discrete particles or grains of abrasives and to a new class of integral abrasive products which are of new properties and capable of new functions, accordingly, upon the surfaces of work to be operated upon therewith.

In the prior art, abrasive products have been developed beyond the scope of natural abrasive stones and loose granular materials, largely in terms of the compositions and properties of the abrasive grain materials and of the bonding of the latter, either by embedding them in a more or less friable matrix or adhesively applying the abrasive grains to flexible surfaces, such as paper, cloth and the like, with friable adhesives. In the case of the integrated, solid, bonded abrasives, the bond may be hard or soft, but unyielding except by fracture. In the coated papers or fibrous materials, as backing materials, such as cloth, adhesion of the abrasive grains is not so strong, more or less flexible, but brittle.

In such products and practices of the prior art, the path and traverse of the work and of the abrasive surface have been positive, both in space (in two dimensions) and in speed. Likewise, it has usually been imperative that the position of the abrasive surface and of the surface to be operated upon, or the work, be positively determined and that the rate and degree of feed of the one and the position, guide and movement of the other shall be accurately related, at all times, in order to get satisfactory co-ordination, accurate operation and results.

By the present invention, such co-ordinated relationship between the abrasive or polishing unit on the one hand and the surface or work to be operated upon, on the other, may be just as accurately provided and maintained during operation. But the dependence of the one upon the other, for satisfactory and accurate results, has been overcome.

Abrasive products, as heretofore developed, are inherently hard and thus have the great disadvantage, more particularly on free-hand work, of leaving chatter marks. Various attempts have been made to overcome this defect. There are rubber bonded wheels but these are only relatively soft and produce chatter to only a lesser degree. Moreover such wheels are limited as to their softness and do not withstand the heat of attrition, which is evidenced by odor and the deposit of the bond upon the work. Relatively soft wheels have been made by combining soft type resins with a reinforcing fabric and with the abrasive grain impregnated in the matrix of the fabric and bond. These wheels too are also relatively hard and slow in cut. The latter action in particular is due to the relatively low level of grain concentration in the finished article.

I have made the discovery and invention that by dispersing abrasive grains in a labile, continuous homogeneous liquid, of low viscosity and surface tension, which is characterized by containing reagents capable of subsequent polymerization to form an elastomer therefrom, with concomitant evolution of a gas, the resulting dispersion intimately and completely wets the surfaces of each abrasive grain and, upon effecting such polymerization reaction, continues to retain the abrasive grains dispersed in the labile, reactant liquid, throughout its reactions and until it sets in the form of a foam structure, of thin, elastomeric films. The dispersed grains are embedded and retained, uniformly spaced and distributed throughout the whole, to present a continuous system of thin elastic films, forming an elastic matrix and a tough, long-wearing abrasive-polishing medium. The product may be shaped to such conformations, sizes and shapes as may be desired and of controllable density, hardness, abrasive grain size or sizes, concentration and action, in terms of the work to be performed by it. Such abrasive products are consequently of ready adaptability to a wide variety of conditions of use, in terms of the shape, character, hardness and composition of the abrasive surface and of the surfaces to be abraded, polished, or otherwise finished therewith.

It may be pointed out that while such reactive mixtures of this invention, characteristically producing foam from the self-contained, dissolved reactants in the liquid from which the film forming polymerization is to take place, may be thus molded and freely and accurately removed from metal molds, without difficulty, it is also found that they can nevertheless be applied to suitable backing materials, such as paper, cloth and the like, and that they are capable of wetting such surfaces intimately and adhering thereto during the reaction and also of developing such adherent bonding union, in the finished, polymerized or set condition, so as to form corresponding abrasive-coated products which are firmly integrated and wholly satisfactory for use in this form, and at the same time manifest all of the unique properties of the molded abrasive products of the invention.

The invention will be described with reference to the use of a polyurethane resin such as may be formed by reaction of a polyester and/or polyether with a di-isocyanate or poly-isocyanate or other resin, of the type which upon the addition of or release of the catalyst generates foam, as a binder for abrasive or polishing agents. Such bonded articles may be made in the form of wheels, points, and a wide variety of shapes, and the like, and of adaptations to the purposes in view, including coated abrasive products, as above mentioned.

I have found that a polyurethane resin, such as one made by reacting a polyester of adipic acid and ethylene or propylene glycol, esterified and polymerized to a molecular weight of approximately 2000, more or less, with a di-isocyanate, gives novel results when catalyzed and handled as I shall describe hereinbelow, to produce abrasive and polishing wheels and the like.

Advantage is utilized of the foam-producing reaction procedure to produce a tough and resilient product which may also be varied widely in hardness. This hardness may be controlled as I shall describe. The foam process provides a high degree of wetting of the grain (which is essential to well bonded products of this type), which phenomena can as desired permit high or low ratios of filler or mineral grains to resin content. The reactive process is taken advantage of also to produce the high degree of uniform dispersion that is essential in such products.

A further advantage accruing from the use of this type of resin is the ability to "tailor" the catalysts and their handling so that a relatively slow or rapid reaction may be obtained, as may best suit the needs of pouring or handling of a particular mix. In addition to such control, I have found that the temperature of the mold or other forming device, the temperature of the abrasive grain admix and the temperature of the resin, as well as the effective temperature of the composite, labile fluid mixture, may all be varied, to effect control, as well as the incipient and applied pressure in the mold, during the reaction. All have individual effects on the nature of the finished product. Variations of these factors singly or in conjunction with each other are all controllable within reason and contribute materially to objective results. These variables may be practically resolved to produce products molded or cast and set on a production schedule which permits release and re-use of the mold or form within a relatively short time, in many instances, ten minutes.

Figure 1:
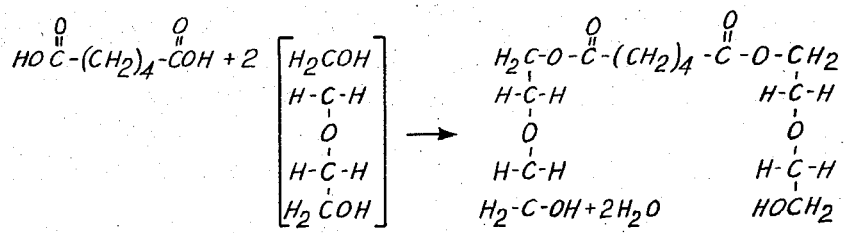

In the following representative examples of my invention, the bonding composition was prepared from an adipic acid diethylene glycol ester, reacted and polymerized to a molecular weight of 2000, more or less, and having two hydroxyl radicals to the molecule. A diagram showing a formation and molecular structure of such resin is given in Fig. 1 and the polymerization of the same in Fig. 2.

Figure 3:
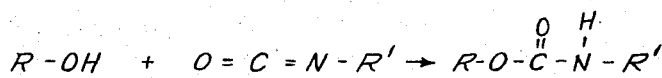
Figure 3:
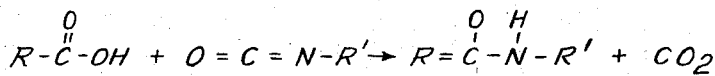

This resin was then reacted with an aryl isocyanate, such as toluene di-isocyanate, to form a urethane linkage and simultaneous reaction with carboxyl radicals of the diethylene glycol ester of adipic acid, thereby to liberate carbon dioxide gas, as illustrated by the reaction shown in Fig. 3, and effect the foaming procedure by concomitant reaction of the continuous, homogeneous, liquid reaction mixture.

The molecular weight to which the polymerization of the resin is carried may be varied, as above mentioned, to effect a corresponding variation in the rate and degree of the reactions to be effected, the physical properties of the mixture during its preparation and reaction, and the formation and characteristics to be developed in the ultimate product to be obtained. This also applies to the degree of hydrolysis, or number or proportion of hydroxyl radicals in the resin polymer as prepared and used.

Figure 4:
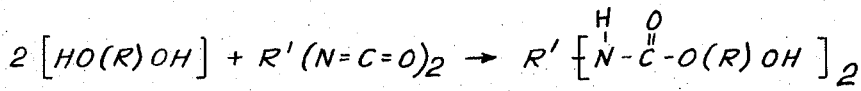

The combination of the diethylene glycol adipic acid ester polymer, with the aryl isocyanate, is illustrated by the reaction set forth in Fig. 4.

The reaction and polymerization of these reagents is exothermic and hence the temperature of each reagent and of the mixture and of the mixing vessel and mold into which the reaction mixture is to be poured should be considered and regulated accordingly. But the reaction may also be regulated and controlled by varying the type and amount of a catalyst and by the rate and degree and time of mixing, before adding the abrasive, and after pouring, as, for example, before closing the mold, and of applying supplementary pressure to the reaction mixture, if that is to be done.

As the labile, polymerizing and preferably spontaneously foaming resin composition develops the degree of activity and viscosity desired, the abrasive grain is added and dispersed rapidly, completely and uniformly therethrough, whereupon the individual particles or grains become completely wetted throughout the surfaces of each discrete, separate grain. And each grain thereupon goes into the interface of the homogeneous liquid, then films of the labile, polymerizing liquid reaction mixture, in the form of bubbles or foam, being thus further dispersed and retained and maintained in such association, as the liquid film-resin structure sets and becomes a solid foam.

The labile and reacting resin polymer is liquid during such operations and as soon as the abrasive grains have been dispersed therein the mixture may be cast, molded, sheeted or otherwise shaped and brought to the dimensions or given other characteristics that may be required or desired, with or without any pressure. If pressure is applied, this tends to restrain and to reduce the bubble size of the foam structure and thus produce a finer texture and product, as well as one of less volume and a consequently greater density. The pressure may be that effected by using simply a closed mold, as inherently developed by the liberation of the gas and the foaming reaction of the mixture, or superposed additional and/or released pressures may be applied and maintained until the reaction is completed and the mixture has solidified.

I have found that the ratio of resin to grain may usefully range from less than 1 to 1 to more than 1 to 7, by weight. This wide range is cited because the fact that governs wetting is that of surface area, given a liquid bonding composition which is capable of specific wetting of the abrasive grain surfaces. Therefore as it is obvious that this composition is of use in conjunction with particles of widely different size (and therefore of surface area to weight ratio) so must the ratio of bond to weight of the mineral particles vary. The ratio of bond in the case of coarse grains is low and in the case of fine sizes is high. As regards the ratio of grain to bond there is no low limit as utility in the form of a burnish finish is obtained from use of a composition so made which contains no abrasive mineral. Naturally from this type of composition any addition of grain up to the maximum increases the abrading characteristics of the product.

Control of the formation of the product and the development of its characteristics is of course first dependent upon the exact type of resin composition and catalyst employed. Beyond this, the control factors are temperature, as applied to the resin, mineral, mixture and mold, and pressure, either externally applied to the molded mixture, or utilized as resulting from the reaction itself, or both. In a confined mold the reacting resin produces a pressure as high as thirty pounds per square inch. For this reason the amount of material relative to the cubic volume of the mold determines the size of the foam formed and thus the density of the product. This, of course, is in terms of the quantity of material actually charged into the mold and the volume of the foam and integrated product formed therefrom, and not the quantity of reactive mixture or material prepared. This may seem to be obvious, but the consistencies of such mixtures are such that the reactive batch, as prepared and ready for molding, may very easily be considerably in excess of that actually transferred to and distributed in the mold cavity, before closing it. The density is also susceptible to variation and control, separately, by varying the ratio of the abrasive grain to the resin bond used in the mixture.

If external pressure is applied to the mold in excess of the internal pressure and is held beyond a critical stage in the gelation process, the internal pressure is overcome, and then, if the mold is vented there will result a composition of extremely high density and hardness and with a minimum of foam structure. If, on the other hand, the external pressure is released prior to gelation and the mold expansion is controlled and retarded there will result a structure with an extremely fine bubble size and a wheel or other shape of abrasive product which, although hard by any standards, still possesses a degree of resiliency not found in such products as now known to the art.

Temperature of the mold is preferably keyed to the temperature of the reacting material, as poured. This gives the greatest uniformity of product. Varying of this temperature in certain shapes and sizes of product may be of advantage. That is, chilling of the mold will aid the pouring and blending of the mixture when a large shape is being made, whereas heating will not hinder and will speed up the process as far as smaller shapes are concerned.

Temperature of the mineral grain and base resin are accordingly controlled in order to facilitate handling of the reactive mix from the mixing vessel to the mold or to the sheeting or coating operations, as the case may be. Control of base resin temperature is also a factor which aids in the control of viscosity and of uniformity of wetting the abrasive grains. Thus with the resins described a temperature below 70° F. would retard the wetting less critically in the case of the very coarsest grades and more critically as the grains employed became finer. Temperatures above 120° F. are not practical except with very small amounts as they promote a reaction too fast to handle. The foregoing reference is meant to be construed to apply to resin temperature control only.

Temperature control of the abrasive or polishing agent before introduction to the mix is of great importance. The control must be keyed so as to obtain good wetting (because mineral temperature will affect the viscosity of the resin as it is being mixed) as well as direct control of the reaction so as to allow time for reaction, mixing, pouring and spreading. These factors are not incompatible (as might appear) because of the different surface areas that must be provided for and handled. For instance, with the medium to coarse grades (16 to 100 mesh) it is an advantage to use the mineral at low temperatures (from 20° to 70° F.). This is because in this range of mineral sizes the surface area to the weight ratio of the grain is not high—the wetting is fast since the reaction is less inhibited. The use of temperature control, even as low as 20° F., is essential to provide time for mixing and handling.

When employing the finer grades and higher concentrations, the problem is to promote the foaming action so as to insure complete wetting and dispersion of the abrasive grains in the reaction mixture. In such cases, grain temperatures as high as 150° F. may be safely and usefully employed. Again, the bond to mineral abrasive ratio is also a governing factor. This control was developed and proved as a result of the observation that insufficient wetting or poor dispersion of the mix resulted from excessive distribution of the resin which did not permit sufficient and efficient foaming of the composition. Temperature control of the grain is therefore essential.

In practice, the catalyst is introduced into the resin and by means of a variable speed mixing head is uniformly distributed. In order to promote uniformity, the grain is not introduced until the foaming has started to become apparent. This promotes the wetting of the abrasive grains, individually and completely, through the action of heat, low viscosity, distribution throughout the entire volume of the mix, extensive film formation of the labile, reacting and polymerizing bonding component, the formation of bubbles of gas throughout the whole, and the development of the maximum surface area of the liquid. Agitation is continued until all of the grains have been introduced and wetted thoroughly, when the operation is stopped and pouring of the mixture into the mold, or other shaping operation, is carried out expeditiously and immediately.

There are many control advantages in the procedure as described. However, it is contemplated that such mixing can be accomplished in an automatic mixing head, such as commonly used in the manipulation of foams. However, as with the hand mixing, the introduction of the grain would be delayed until after the foaming action starts and this does presuppose a two-stage mixing head.

Although the finished product may have the appearance to the layman of a rubber product, it is to be emphasized that what is accomplished here is not possible with rubber. The end result here is a foam of higher tensile strength and greater toughness, as well as heat resistance. Moreover, it is known that rubbers in the foaming stages do not possess the wetting abilities of the resins of this invention. Foaming in rubber mixes must be induced mechanically and/or by the extraneous introduction or formation of a gas, whereas this invention utilizes and provides for the characteristics of the resin formation and polymerization reactions, spontaneously and inherently to generate the gas, from the homogeneous, labile, liquid reaction matrix, per se.

Because the material is an elastomer and subject to elongation under stress, as at high speeds, the softer types will expand in the usual abrasive and polishing operations due to centrifugal force. Likewise, they will contract and return to their normal dimensions and shapes, when such stresses and strains are released. Such expansion and correlative contraction may be controlled within practical limits, if desired, by using the product as an outer layer or covering on a drum or sleeve, expansively held, as is common in such situations. Thus an outside layer, on a core of stronger material, of an inch or two inches in thickness, will permit higher speeds than would be desirable with a wheel of like dimensions, made entirely of the elastic bonded abrasive product of this invention.

A similar effect may also be achieved by the introduction of fine flock or fibers into the foam, in conjunction with the addition of the abrasive material. This then serves to strengthen the wheel or other shape against the stress and strain of high peripheral speeds of operation.

In accordance with the foregoing described procedures, the following typical and representative examples of the invention were carried out, resulting in the obtainment of satisfactory products, of the properties set forth in connection with each, and useful for application to usual abrasive and/or polishing operations and upon various kinds and conditions of surfaces of work to be operated upon.

In the procedure for performing the examples, the amount of resin is weighed as also are the amounts of the other ingredients. The resin and mineral are then brought within the specified temperature range.

A container is charged with the resin and mixing is started slowly, the catalyst is added to the mix under agitation and the speed of mix is increased so that the catalyst is rapidly and uniformly dispersed in the resin. As soon as the catalyst is introduced the mineral container is readied. Introduction of the mineral is withheld until it is seen that the reaction has started and at this moment the mineral is introduced into the vortex caused by the mixing head. The speed with which the mineral is introduced is keyed to the generation of the foam so that all particles may be uniformly wet and dispersed. Too slow an introduction of mineral permits the reaction to get out of hand and beyond mixing or control; too fast a rate of introduction may result in ununiform wetting and thus a mix that it not uniformly reactive.

At such time (and with the aid of a variable speed drive on the mixer) as the mix is seen to be uniformly wet and before the reaction is proceeding vigorously the reacting contents are then spread or poured or distributed as may be required for the particular object being manufactured. In those cases where a confined mold is to be employed the rate of pour must be keyed to the rate of advancing reaction or foam, so that the mold may be uniformly charged. As a part of the same operation it is preferable that the procedure be so conducted that the final closure of the mold coincides with that point where little or no air space remains in the mold.

At such time as the mold is closed it is made secure, either so as to define the volume of the finished product or so as to be ready to receive supplemental pressure if such is to be used, or permit subsequent expansion of the charge, in the closed mold, if this is desired.

Time for completion of reaction and firm gelation of the mix is a variable depending upon factors of mass reaction, temperature, catalyst, etc. However, rarely is this period in excess of 15 minutes at the end of which time the mold is discharged and readied for re-use.

At the time the finished article is withdrawn from the mold a further period of cure is advisable before the composition is ready for use. This may be accomplished by an over cure at 200° F. for 16 hours, or a longer or shorter period dependent upon temperatures.

In the preparation of the examples cited, the base resin used was such as supplied by Barrett Division of Allied Chemical Company as Plaskon P.F.R. #5.

D.M.E. and morpholine are nomenclatures describing the following formulas used as catalysts:

D.M.E.:
    60 parts $H_2O$
    40 parts Tween #80 wetting agent
    10 parts di-methyl-ethanolamine Morpholine:
    42 parts $H_2O$
    21 parts Tween #80 wetting agent
    42 parts morpholine

*Example #1*

150 grams resin at 70° F.
450 grams #80 mesh aluminum oxide mineral at 60° F.
6 grams D.M.E.
6 grams morpholine Mixed and poured into a confined mold to make a wheel 8″ diameter by 1½″ face.

Density: 7.5 grams per cubic inch (.458 gram per cubic centimeter)
Hardness: 20 Shore scale

*Example #2*

225 grams resin at 88° F.
675 grams #80 mesh aluminum oxide mineral at 62° F.
9 grams D.M.E.
9 grams morpholine Mixed and poured into a confined mold to make a wheel 8″ diameter by 1½″ face.

Density: 10.5 grams per cubic inch (.641 gram per cubic centimeter)
Hardness: 35 Shore scale

*Example #3*

250 grams resin at 80° F.
750 grams #80 mesh aluminum oxide at 63° F.
10 grams D.M.E.
10 grams morpholine Mixed and poured into a confined mold to make a wheel 8″ by 1½″.

Density: 12.3 grams per cubic inch (.750 gram per cubic centimeter)
Hardness: 50 Shore scale

*Example #4*

200 grams resin at 75° F.
600 grams #80 mesh aluminum oxide at 40° F.
8 grams D.M.E.
8 grams morpholine Mixed and poured into a mold with a tight fitting but movable top, 8″ diameter. Top subjected to a pressure of 90 pounds per square inch. Finish wheel 8″ diameter by 1″ face.

Density: 14.8 grams per cubic inch (.903 gram per cubic centimeter)
Hardness: 57 Shore scale

*Example #5*

200 grams resin at 80° F.
600 grams #80 aluminum oxide sand at 40° F.
8 grams D.M.E.
8 grams morpholine Handled in same procedure as #4 except pressure in the order of 200 pounds per square inch applied. Finished wheel 8″ diameter by ¾″ face.

Density: 19.6 grams per cubic inch (1.196 grams per cubic centimeter)
Hardness: 70 Shore scale

*Example #6*

300 grams resin at 70° F.
900 grams #80 aluminum oxide sand at 40° F.
12 grams D.M.E.
12 grams morpholine Handled in same procedure as #4 except pressure in the order of 350 pounds per square inch applied. Finished wheel 8″ diameter by ¾″ face.

Density: 29.8 grams per cubic inch (1.818 grams per cubic centimeter)
Hardness: 98 Shore scale

*Example #7*

200 grams resin at 70° F.
400 grams #180 aluminum oxide sand at 85° F.
8 grams D.M.E.
8 grams morpholine Mixed and poured into a confined mold to make a wheel 8″ diameter by 1″ face.

Density: 7.2 grams per cubic inch (.439 gram per cubic centimeter)
Hardness: 45 Shore scale

*Example #8*

235 grams resin at 80° F.
705 grams #180 aluminum oxide at 85° F.
8.5 grams D.M.E.
8.5 grams morpholine Mixed and poured into a confined mold to make a wheel 8″ diameter by 1½″ face.

Density: 10 grams per cubic inch (.610 gram per cubic centimeter)
Hardness: 55 Shore scale

*Example #9*

150 grams resin at 100° F.
750 grams #24 grit aluminum oxide mineral at 60° F.
6 grams D.M.E.
6 grams morpholine Mixed and poured into a confined mold to make a wheel 8″ diameter by ¾″ thick.

Density: 21.8 grams per cubic inch (1.330 grams per cubic centimeter)
Hardness: Approximately 45 Shore scale (due to the large grain size relative to bonding areas the Shore type of measure is an approximation only on products of this type)

*Example #10*

200 grams resin at 80° F.
600 grams #80 aluminium oxide sand at 55° F.
8 grams D.M.E.
8 grams morpholine Mixed and poured into confined mold to make wheel 8″ diameter by 1½″ face.

Density: 7.7 grams per cubic inch (.470 gram per cubic centimeter)
Hardness: 20 Shore scale

*Example #11*

Same proportions and temperatures #10. Mixed and poured into confined mold to make a wheel 8″ by 1″ face.

Density: 18.6 grams per cubic inch (1.135 grams per cubic centimeter)
Hardness: 60 Shore scale One of the unique results of the invention described is the finish that is imparted to the workpiece as abraded by such abrasive products. The finish received is (grit size for grit size) very much finer than that obtained by use of either the conventional grinding wheel or surface coated abrasive. A characteristic phenomenon is a removal of stock (albeit at a slower rate), which leaves a polished finish rather than a scratch finish. This phenomenon I have observed is due to the even dispersion of the grain throughout the structure, with each particle individually coated and cushioned in a free film of elastic bond, as a result of the chemically controlled foaming, settling and polymerizing process. The result is a composition that is elastic as a whole and in the individual bonding films and is exceedingly tough, wherein the resin foam cushions the grain action in all three dimensions and acts to control the penetration of the grain or polishing particle into the surface of the work.

A further advantage of such a wheel structure is that it may be readily dressed or contoured to a particular shape or radius. This is accomplished by the use of a coarse (such as a No. 40 grit, for example) open coat resin bonded coated abrasive cloth in the shape of the desired contour. In practice this is held against the moving periphery of the wheel so as to contour the same.

Attributable further to the characteristics of the process described and to the novel and unique properties of this new class or type of abrasive products, is the fact that a wheel so made does not load or fill as do the harder and conventional wheels or coated abrasive products. It is evident that the constant flexing of the bonding film in three dimensions, in the abrasive operations of use, and under the pressure of work constitutes an action which throws out and prevents packing of work particles which load either a conventional wheel or surface coated abrasive. Despite this flexing the grains are so securely held that they remain fixed although free to give—either until finally pulled from their sockets by wearing of the bond or until the wheel is dressed. In any case, the wear is not rapid and the finish remains constant between dressings.

The speed of cut, when employing a single grit size, is controlled by the factor of hardness and grain concentration. Finish also will vary with hardness. Therefore finish, cut and hardness are influenced by the ratio of mineral abrasive grain to bond, as well as texture of composition which is here dependent upon and controlled by catalyst, temperature and pressure, as above described. For instance, a wheel with a density of 7.7 grams per cubic inch had a hardness of 20 or less on the Shore scale of hardness (as cited in Example #10), whereas a wheel of a density of 18.6 grams per cubic inch had a hardness of 60 or more, by the Shore scale, as cited in Example #11.

Both wheels cited above were made with a ratio of 600 parts by weight of mineral abrasive grain (80 mesh grit-aluminum oxide) to 200 parts of resin and with the same catalyst and amount of the same. The former wheel is so soft as to permit the easy polishing of contoured shapes and will conform to fillets and the like without cutting deeply on the edges of the wheel. The latter wheel, because of its hardness, has a rate of stock removal at least double that of the former and will compare in general performance with the conventional rubber wheels as regards cut. However, its finish will be finer and it will not be subject to the objections to rubber wheels. In the case of both wheels cited, the temperatures of mineral as well as of the resin and mixing conditions, and the mold temperatures were identical. The only variable employed was that of total weight of mix to volume, the results being two wheels alike in composition but widely different in texture, rate of cut and performance in their grinding or polishing actions.

By way of demonstration of the new properties and qualities of abrasive action which the products of the present invention possess and manifest in use, it may be pointed out that the wheels above described have been used successfully and satisfactorily at speeds of 1700 to 3700 r.p.m. and on symmetrical work and on work presenting radical contours, shapes and dimensions, and primarily for cutting by abrasive removal of stock or primarily for polishing. Moreover, they have been applied and are found adaptable to all kinds of metal surfaces, such as steel, cast iron and bronze, for example, and to non-metal surfaces, such as plastics, wood and the like.

Owing to the three-dimensional spacing of each discrete abrasive particle, spaced from adjacent particles and held, per se, occluded in a continuous, thin film of elastic bonding medium, the abrasive products of this invention have a soft feel to the touch, regardless of the high proportions of abrasive grains which they may contain. It is therefore manifest from this sensible characterization of these properties why they exhibit a new type of grinding and polishing action upon the work, unlike all of the abrasive products of the prior art. Each abrasive grain, thus mounted in a thin, elastic film is only yieldingly pressed against it, at all times, and is free to yield to such pressure in all three dimensions.

I claim:

1. An abrasive wheel densified by pressure to a density of at least about 0.439 gram per cubic centimeter, said wheel being characterized by a foam structure of thin elastic films and discreet abrasive grains dispersed therethrough, severally embedded in and retained by said films of the elastic solid as a continuous elastic bond, the weight of said grains being at least equal to the weight of said elastic bond, the said foam structure comprising the foamed reaction product of reagents of the class consisting of aliphatic polyesters and polyethers, with isocyanates, reacted to polymerize and form elastomers, as the said bond.

2. An abrasive wheel according to claim 1 in which the ratio of the weight of said grains to said elastic bond is between about 1:1 to 7:1.

3. An abrasive wheel according to claim 1 wherein the density of the wheel is at least about 0.610 gram per cubic centimeter.

4. An abrasive wheel according to claim 3 in which the ratio of the weight of said grains to said elastic bond is between about 1:1 to 7:1.

5. The method of bonding abrasive wheels comprising the steps of mixing reagents of the class consisting of aliphatic polyesters and polyethers with isocyanates, reactive to polymerize and form elastomers and to foam, with a catalyst of said reactants, dispersing the abrasive grains in the reactant and foaming mixture and reacting under conditions of temperature of about 20° F. to 150° F. and an internal pressure developed in a confined mold up to about 30 pounds per square inch above atmospheric pressure to promote and control the reaction and to shape the reactant mixture, the density of said wheel being at least about 0.439 gram per cubic centimeter and the ratio of the weight of said grains to said elastic bond being between about 1:1 to 7:1.

6. The method according to claim 5 wherein an external pressure is applied to the reactant mixture in the mold in addition to the said developed internal reaction pressure in the mold.

References Cited in the file of this patent

UNITED STATES PATENTS 2,764,565    Hoppe et al.            Sept. 25, 1956

FOREIGN PATENTS 716,422      Great Britain            Oct. 6, 1954